G. L. HIMMELBERGER.
ANTISKID DEVICE FOR VEHICLE WHEELS.
APPLICATION FILED DEC. 7, 1916.
1,218,657.
Patented Mar. 13, 1917.
2 SHEETS—SHEET 1.
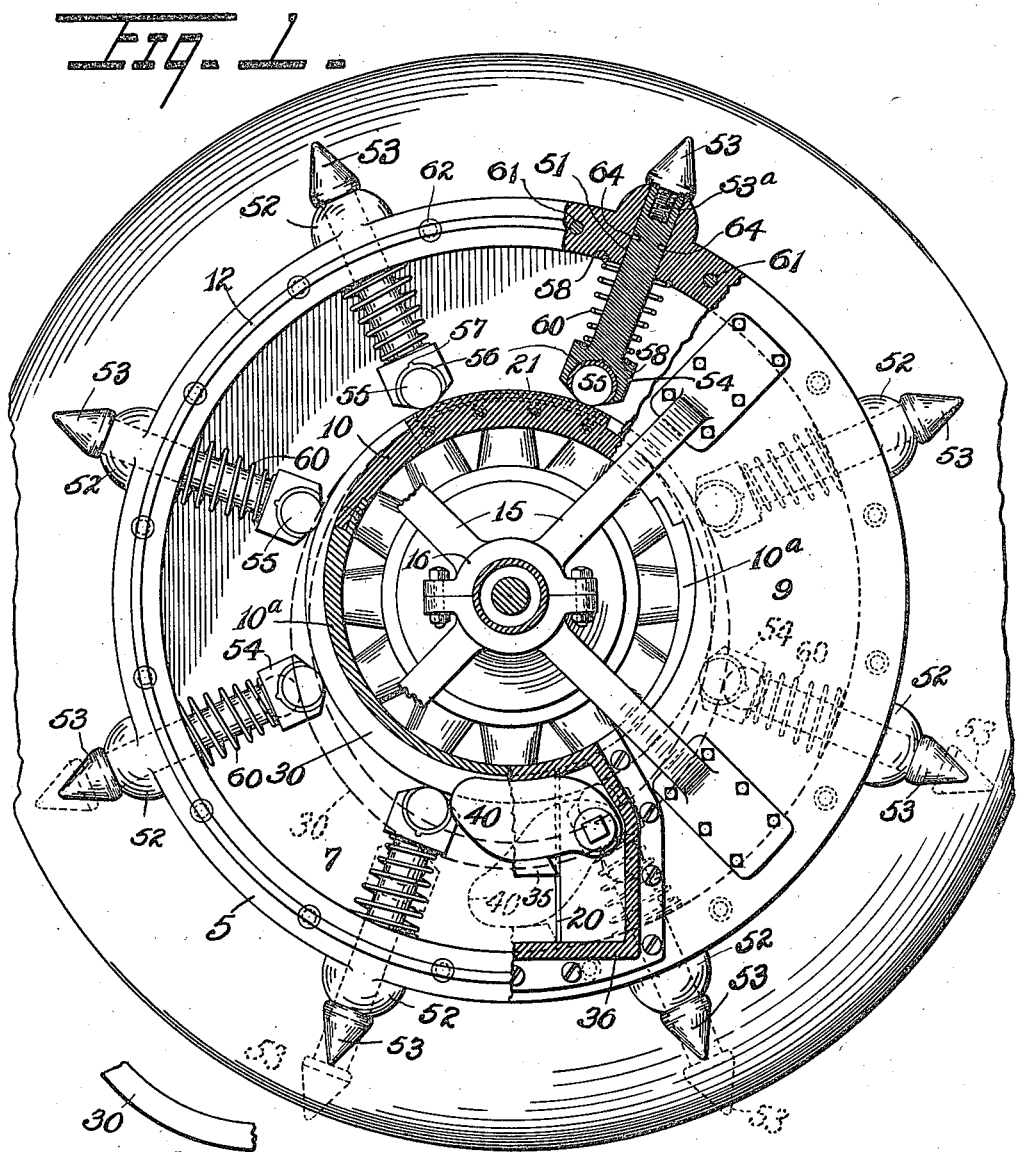
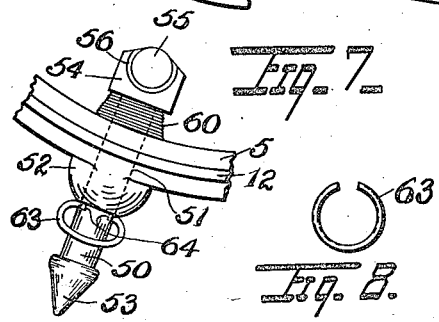
George L. Himmelberger, Inventor

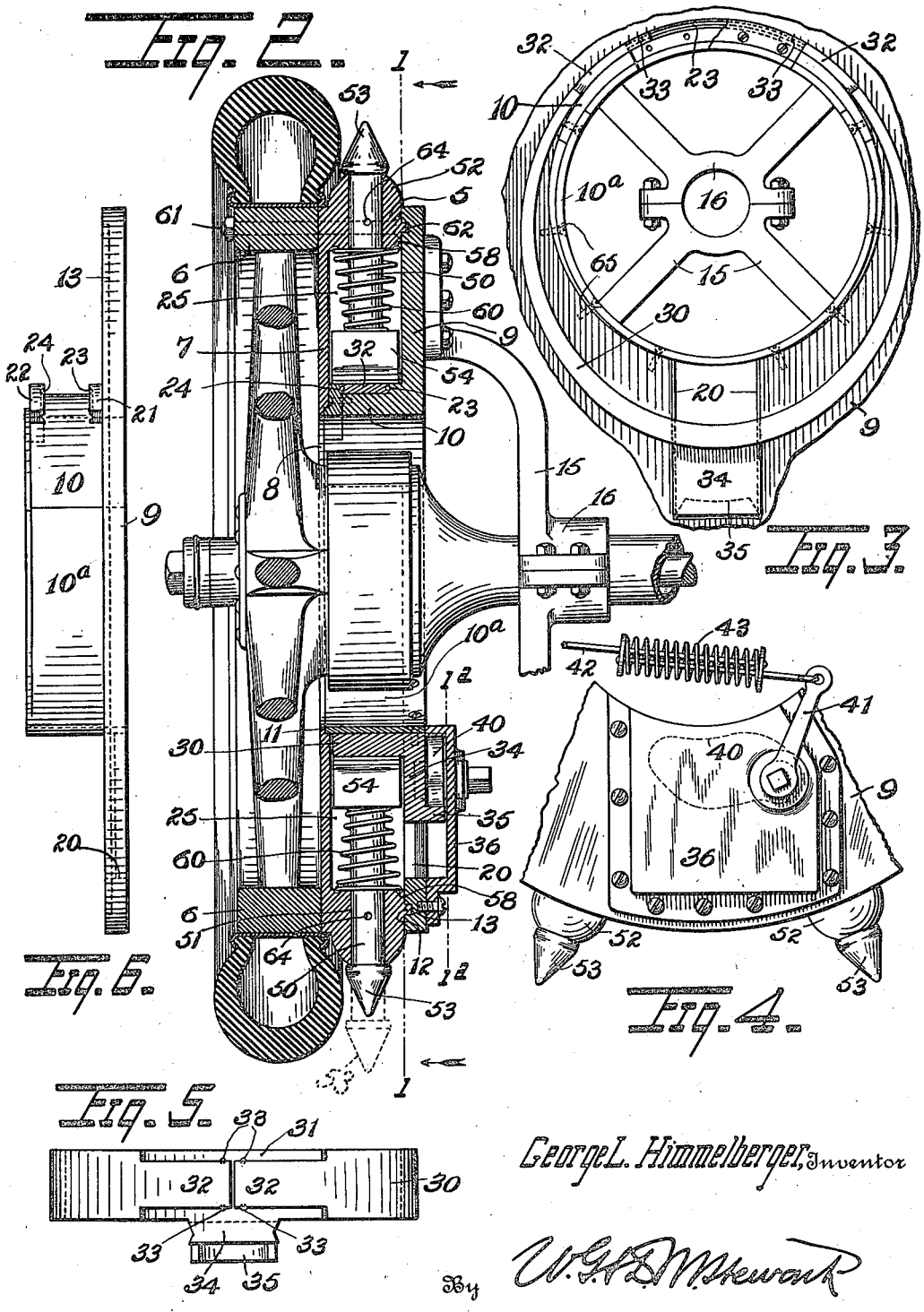

UNITED STATES PATENT OFFICE.

GEORGE L. HIMMELBERGER, OF READING, PENNSYLVANIA.

ANTISKID DEVICE FOR VEHICLE-WHEELS.

1,218,657.      Specification of Letters Patent.      Patented Mar. 13, 1917.

Application filed December 7, 1916.   Serial No. 135,550.

*To all whom it may concern:*

Be it known that I, GEORGE L. HIMMELBERGER, a citizen of the United States, residing at the city of Reading, in the county of Berks and State of Pennsylvania, have invented certain new and useful Improvements in Antiskid Devices for Vehicle-Wheels, of which the following is a specification.

My invention relates to anti-skid devices for vehicle wheels wherein radially movable spikes are projected when desired at the tread portion only of the wheel, and my objects are to provide a compact unit that may be readily attached, is positive in its action and operates silently at all times without sudden shocks or undue friction. Other objects will appear in the following specification describing my invention in connection with the accompanying drawings, and the novel features are pointed out in the subjoined claims.

Figure 1 is mainly an inner-face view of my device applied to an automobile wheel, the view being taken on the line 1—1 of Fig. 2, the non-rotating cover plate however being partly shown, and the cam casing on the latter being in section on the line 1ª—1ª of Fig. 2.

Fig. 2 is a vertical axial section of the same.

Fig. 3 is a fragmentary inner-face view of the non-rotating cover plate showing the expansion ring in its eccentric shape.

Fig. 4 is a fragmentary view showing the cam casing on the non-rotating cover plate.

Fig. 5 is an edge view of the expansion ring in normally closed position.

Fig. 6 is an edge view of the non-rotating cover plate with its annulus assembled.

Fig. 7 is a detail fragmentary view showing one of the spikes held in retracted position for assembling; and Fig. 8 shows the ring for holding the spike in this position.

It is essential in devices of this character that they should not only be readily applicable to the vehicle wheels and act quickly and reliably when needed, but that they should at all times run smoothly and quietly with little friction, to secure the best and most satisfactory results. With these aims in view, I form my device, as shown in the drawings, in two main sections, one being secured to the rotating wheel, and the other to the non-rotating axle housing, the two jointly providing an oil and dust proof casing within which my operating mechanism freely runs in oil or grease.

The rotating part of this casing is formed by a spike-ring 5 securely bolted to the felly 6 of the wheel concentric with the axle, the ring having a radially extended flange 7 forming a wall of the casing, and a central opening 8 being provided for the axle housing and band brake as shown. The non-rotating part of the casing is formed by a cover plate 9 bearing against the inner face of the spike-ring 5 and having an annulus or annular flanged ring 10 extending into the spike-ring to the wall 7 of the latter. This annulus 10 fits into a circular groove 11 in the opening 8 and forms an oil and dust proof connection between the rotating flange 7 and the non-rotating annulus 10. A circular rib 12 on the face of the rotating spike-ring 5 similarly engages the circular groove 13 of the non-rotating cover plate 9 to form an outer oil and dust proof connection. This cover plate 9 is secured to the non-rotating axle, or its housing as shown, by a spider 15 bolted to the cover plate and adjustable on said axle housing as by a split collar 16, for adjusting the cover-plate to the spike-ring to form an accurate fit without undue friction.

The cover-plate 9 is also provided with an opening 20 forming a slide-way, and the annulus 10 has a removable section 10ª which acts as a cover for the opening 20 so as to permit the introduction of a slide-block into the latter as more fully hereinafter described. Opposite the opening 20 the annulus 10 is provided with spaced circumferential flanges 21—22, the latter being preferably separately formed and screwed to the annulus as shown, and the inner faces of these flanges are provided with grooved ways 23—24 for a purpose hereinafter described.

Supported upon the outer circumference of the annulus 10, and within the annular chamber 25 of the casing, is a split-expansion ring 30. This ring is preferably made of spring metal and is gradually reduced in thickness from its middle 31 to its split upper ends 32—32; the latter being reduced in width as shown to fit between the flanges 21 and 22 formed on the annulus as stated. Anti-friction balls 33, 33, 33, 33 seated in recesses near the split ends 32—32 project into the grooved ways 23—24 to maintain said ends in contact with the annulus, but permitting their sliding separation during expansion. An off-set extension 34 of the ring 30, integrally formed with the latter as shown, is adapted to engage in the slideway 20, and has a cam seat projection 35 extended beyond the face of the cover plate. A cam casing 36 covers the opening 20 in the cover plate, is bolted to the latter, and has mounted therein a cam 40 as shown formed with a pinion projecting through said casing. This cam 40 acts upon the cam seat 35 on the extension 34 of the expansion ring 30 so as to move the latter upon its supporting annulus 10 to spread the split ends 32—32 as shown in assuming the eccentric shape indicated in full lines in Fig. 3, and in dotted lines in Fig. 1. A crank arm 41 on the pinion 40 is connected by a rod 42 to a lever or pedal conveniently arranged near the operator or driver. I do not connect the rod 42 to the arm 41 directly, but preferably interpose a spring 43 to permit movement of the cam 40 under undue strains as later herein described.

The spike-ring 5 is provided with spaced radially movable spikes 50 which are mounted in openings 51 in the ring forming bearings for their radial movement, said bearings being extended as shown by hemispherical projections 52. The outwardly extending ends of said spikes are preferably provided with removable points 53 which latter as shown are screwed into the spikes, the studs 53ª being preferably filleted to the heads for additional strength and may be secured to the spikes by a locking washer or the like not shown. The inner ends of the spikes are formed with square headed ends 54 as shown, which heads are approximately of a width equal to the width of the chamber 25 and are provided with anti-friction rollers 55 loosely supported therein and riding on the expansion ring 30. A bushing bearing 56 for the rollers is preferably provided as shown and prevented from turning with the latter by a rib 57.

Around the openings 51 in the spike-ring 5 and in the heads 54 are formed circular grooves in which are placed anti-rattle washers 58 of leather or the like, and seated upon said washers and surrounding the spikes 50 are spiral springs 60 preferably conoidal as shown to permit of greater closing movement. These springs bearing on the ends 54 and the inner face of the ring 5 force the spike rollers 55 into contact with the expansion ring 30 as shown, maintaining the spikes normally in retracted position and tend to force the expansion ring to its concentric shape on the annulus 10, during the rotation of the wheel.

In assembling my device, the spike-ring 5, with its radially mounted spikes, is first concentrically bolted to the felly 6 of the wheel, the bolts 61 shown having heads 62 forming part of the circular rib 12 to fill out the latter and prevent turning of the bolts. The spikes are then forced outward, compressing their springs, as shown in Fig. 7, and held in this position as by a split ring 63 sprung on the spike and engaging in notches 64 provided therefor. This outwardly extended position of the spikes gives sufficient clearance for the ready introduction of the cover plate and its assembled parts.

The cover plate 9 has assembled thereon the expansion ring 30 and operating cam 40 shown in the drawings, by removing the casing 36 of the opening 20, the removable section 10ª of the annulus 10, and the flange 22 on the latter. The expansion ring 30 with its integral offset extension 34 may now be set over the annulus 10 and its extension entered into the slideway opening 20, the reduced split ends 32—32 with their balls 33, 33, 33, 33 engaging in the grooved ways 23—24 of the flange 21 and the replaced flange 22. The removable section 10ª is then secured to the cover plate by screws 65 as shown, and the cam 40 with its casing 36 bolted over the opening 20. This assembled cover plate section is then secured to the axle housing by the spider 15 and adjusted to the spike ring 5 by means of the split collar 16 as shown, so as to make a tight revolving fit between the groove 11 and annulus 10 and the rib 12 and groove 13. The chamber 25 may be filled with oil or grease to insure quiet easy movement of the parts, and a grease cup supplied to the cover plate for properly maintaining the supply in the chamber, which as stated is both oil and dust proof.

The operation of my device well be readily understood from the foregoing description, the spikes normally riding on the retracted expansion ring concentrically supported upon the annulus 10 as shown. When the cam 40 is turned to move the extension 34 downward in its slideway opening 20 the ring is expanded, the split ends sliding in the grooved ways 23 24, its maximum expansion being shown in Fig. 3, and in dotted lines in Fig. 1. The spikes then ride upon this expanded eccentric track ring, which moves them radially in their bearings in the ring 5 against the tension of their springs 60, so as to project their points at the tread portion of the tire, but permit their retraction at the opposite point, as clearly shown in dotted lines in Fig. 1. The rollers 55 of the spike heads 54 ride upon the tops of the flanges 21 22 over the spread ends 32 32, so as to give a smooth easy movement and prevent noise or shock. The spike points do not normally contact with the road bed except when riding on the eccentrically expanded ring 30 when the lower ones of the revolving wheel grip the road bed to prevent skidding or slippage. The spring 43 provides for retraction of the spike when the latter strikes an obstruction or hard surface, the tension of the latter determining the force with which the cam will expand the ring 30.

My device is compact and strong, may be readily attached to a vehicle wheel, runs smoothly and quietly with little friction, is sure and reliable in its action when required, and provides for releasing itself from undue strains. The details specifically described in the foregoing description may be modified and others added, the essential features being specifically pointed out in the claims.

What I claim is:—

1. In an anti-skid device for vehicle wheels, a spike-ring concentrically secured to the wheel, radially movable spikes mounted therein, a non-rotating cover plate for said ring having an annulus extended into the latter, an expansion ring supported on said annulus and normally forming a concentric track for said spikes, and means to eccentrically expand said expansion ring.

2. In an anti-skid device for vehicle wheels, a spike-ring having a radially extended flange concentrically secured to the wheel and forming one member of a casing, a non-rotating cover-plate for said ring having an annulus extended into the latter and forming the other member of the casing, an expansion ring within said casing normally concentrically supported on said annulus, and spikes radially mounted in said spike-ring and riding on said expansion ring.

3. In an anti-skid device for vehicle wheels, a spike-ring concentrically secured to the wheel and provided with a radially extended flange formed with a grooved central opening, a non-rotating cover-plate for said spike-ring having an annulus extended into said grooved central opening of the radially extended flange, a coöperating groove and recess on the meeting faces of said cover plate and spike-ring, an expansion ring normally supported on said annulus, and spikes radially mounted in said spike-ring and riding on said expansion ring.

4. In an anti-skid device for vehicle wheels, a spike-ring concentrically secured to the wheel, a non-rotating cover-plate for said ring having an annulus extending into the latter, an expansion ring normally concentrically supported on said annulus, spikes radially mounted in said spike-ring and having headed inner ends riding on said expansion ring, and spiral springs on said spikes between said headed ends and the spike-ring.

5. In an anti-skid device for vehicle wheels, a spike-ring concentrically secured to the wheel, a non-rotating cover-plate for said ring having an annulus extending into the latter, an expansion ring normally concentrically supported on said annulus, spikes radially mounted in said spike-ring and having headed inner ends riding on said expansion ring, circular grooves in said headed ends and in the spike-ring surrounding said spike openings, anti-rattle washers in said circular grooves, and spiral springs on said spikes seating on said washers.

6. In an anti-skid device for vehicle wheels, a spike-ring concentrically secured to the wheel, a non-rotating cover-plate for said ring having an annulus extending into the latter, an expansion ring normally concentrically supported on said annulus, spikes radially mounted in said spike-ring and having headed inner ends riding on said expansion ring, antifriction rollers loosely supported in said headed ends, and spiral springs on said spikes between said headed ends and the spike-ring.

7. In an anti-skid device for vehicle wheels, a spike-ring concentrically secured to the wheel, a non-rotating cover-plate for said ring having an annulus extending into the latter, an expansion ring normally concentrically supported on said annulus, spikes radially mounted in said spike-ring and having removable spike-points on their outer ends, and headed inner ends loosely inclosing anti-friction rollers riding on said expansion ring, and spiral springs on said spikes between said headed ends and the spike-ring.

8. In an anti-skid device for vehicle wheels, a spike-ring concentrically secured to the wheel and carrying radially movable spikes therein, a non-rotating cover-plate for said spike-ring having an opening forming a slide-way, an annular flange on said cover plate projected into said spike-ring and provided with a removable section covering said opening, and an expansion-ring normally concentrically supported on said anular flange and having an extension slidably engaged in said slide-way opening.

9. In an anti-skid device for vehicle wheels, a spike-ring concentrically secured to the wheel and carrying radially movable spikes therein, a non-rotating cover-plate for said spike-ring having an opening forming a slide-way, an annular flange on said cover plate projected into said spike-ring and provided with a removable section covering said opening, an expansion-ring normally concentrically supported on said annular flange and having an extension slidably engaged in said slide-way opening, and a cam mounted in a housing on said cover plate to move said extension in said slide-way.

10. In an anti-skid device for vehicle wheels, a spike-ring concentrically secured to the wheel and carrying radially movable spikes therein, a non-rotating cover-plate for said spike-ring having an annulus projected into the latter, circumferentially grooved flanges on said annulus, and a split expansion-ring normally concentrically supported on said annulus and provided with anti-friction balls near the split ends adapted to engage in said grooved flanges.

In testimony whereof I affix my signature.

GEORGE L. HIMMELBERGER.